(12) United States Patent
Rapoport

(10) Patent No.: US 9,006,914 B2
(45) Date of Patent: Apr. 14, 2015

(54) ELECTROMAGNETIC DEVICE FOR GENERATING ELECTRICAL CURRENT AND METHODS THEREOF

(76) Inventor: Uri Rapoport, Moshav Ben Shemen (IL)

( * ) Notice: Subject to any disclaimer, the term of this patent is extended or adjusted under 35 U.S.C. 154(b) by 575 days.

(21) Appl. No.: 13/343,737

(22) Filed: Jan. 5, 2012

(65) Prior Publication Data

US 2012/0169069 A1    Jul. 5, 2012

Related U.S. Application Data

(63) Continuation-in-part of application No. 12/304,524, filed as application No. PCT/IL2007/000703 on Jun. 11, 2007, now abandoned.

(60) Provisional application No. 60/812,615, filed on Jun. 12, 2006.

(51) Int. Cl.
| | |
|---|---|
| *H02K 7/09* | (2006.01) |
| *H02N 15/00* | (2006.01) |
| *H02K 21/00* | (2006.01) |
| *H02K 35/00* | (2006.01) |
| *H02K 35/06* | (2006.01) |

(Continued)

(52) U.S. Cl.
CPC ............. *H02K 35/06* (2013.01); *H02K 35/02* (2013.01); *H02K 7/09* (2013.01); *H02K 7/1876* (2013.01); *H02K 7/1892* (2013.01)

(58) Field of Classification Search
USPC ......... 310/90.5, 152, 159, 171, 15, 17; 322/3; 290/1 R
See application file for complete search history.

(56) References Cited

U.S. PATENT DOCUMENTS

| 238,631 A | 3/1881 | Ball |
|---|---|---|
| 406,968 A | 7/1889 | Tesla |

(Continued)

FOREIGN PATENT DOCUMENTS

| GB | 2397698 | 7/2004 |
|---|---|---|
| JP | 2006149164 | 6/2006 |
| RU | 2177201 C1 | 12/2001 |

OTHER PUBLICATIONS

M.V.Berry et al. "Of flying frogs and levitrons", Eur.J.Phys.18 (1997) 307-313.*

(Continued)

*Primary Examiner* — Burton Mullins
(74) *Attorney, Agent, or Firm* — Paul D. Bianco; Martin Fleit; Fleit Gibbons Gutman Bongini & Bianco PL

(57) ABSTRACT

An AC current generator for generating an CA current and method therefor and includes a stator and a rotor. The stator includes an outer shell of non-magnetic material enclosing an evacuated chamber and having a distribution of a plurality of ferromagnets attached thereto. The rotor includes an inner core of non-magnetic material located at a stability location within said evacuated chamber and having a distribution of a plurality of diamagnets attached thereto. In addition, the AC current generator includes at least one magnetic flux detection unit located within at least one magnetic field generated by at least one group of ferromagnets of the plurality of ferromagnets. Displacing the rotor from the stability location towards the at least one group of ferromagnets generates a change in magnetic flux in the magnetic field thereby generating an AC current in the at least one magnetic flux detection unit.

27 Claims, 8 Drawing Sheets

(51) Int. Cl.
*H02K 35/02* (2006.01)
*H02K 7/18* (2006.01)

(56) References Cited

U.S. PATENT DOCUMENTS

| | | | |
|---|---|---|---|
| 2,239,144 A | | 4/1941 | Dean et al. |
| 2,323,837 A | | 7/1943 | Neal |
| 3,243,238 A | | 3/1966 | Lyman |
| 3,512,852 A | | 5/1970 | North |
| 3,815,963 A | * | 6/1974 | Wilk .......................... 310/90.5 |
| 3,888,553 A | * | 6/1975 | Wehde ........................ 310/90.5 |
| 4,222,021 A | | 9/1980 | Bunker, Jr. |
| 4,379,598 A | | 4/1983 | Goldowsky |
| 4,382,245 A | | 5/1983 | Harrigan |
| 4,492,875 A | | 1/1985 | Rowe |
| 4,517,514 A | | 5/1985 | Howell |
| 4,585,282 A | | 4/1986 | Bosley |
| 4,761,579 A | * | 8/1988 | Delassus ...................... 310/90.5 |
| 5,410,199 A | * | 4/1995 | Kinugasa et al. .......... 310/12.11 |
| 5,506,558 A | | 4/1996 | Laube |
| 6,175,175 B1 | * | 1/2001 | Hull ............................. 310/90.5 |
| 6,232,671 B1 | * | 5/2001 | Gottfried, Jr. ................. 290/1 R |
| 6,351,049 B1 | | 2/2002 | Chassoulier et al. |
| 6,879,076 B2 | | 4/2005 | Long |
| 6,898,970 B2 | * | 5/2005 | Berstis ........................ 73/382 R |
| 7,023,122 B2 | | 4/2006 | Gang |
| 7,394,183 B2 | | 7/2008 | Ramer |
| 7,501,922 B2 | | 3/2009 | Kazadi |
| 2003/0197433 A1 | | 10/2003 | Cheung et al. |
| 2004/0140875 A1 | | 7/2004 | Strom |
| 2006/0001323 A1 | | 1/2006 | Gang |
| 2007/0096603 A1 | | 5/2007 | Ramer |
| 2009/0167033 A1 | | 7/2009 | Rapoport |

OTHER PUBLICATIONS

International Search Report published Aug. 14, 2008 for PCT/IL2007/000703 filed Jun. 11, 2007.
International Preliminary Report on Patentability published Dec. 16, 2008 for PCT/IL2007/000703 Jun. 11, 2007.
Written Opinion of the International Search Authority published Dec. 12, 2008 for PCT/IL2007/000703 Jun. 11, 2007.
Office Action for U.S. Appl. No. 12/304,524 issued Jan. 31, 2011.
Response to Office Action for U.S. Appl. No. 12/304,524 issued Jan. 31, 2011 filed May 31, 2011.
Final Office Action for U.S. Appl. No. 12/304,524 issued Aug. 5, 2011.
P. Gibbs, A. Geim "Is Magnetic Levitation Possible" Mar. 18, 1997. http://www.ru.nl/hfml/research/levitation/diamagnetic/levitation_possible/.
Wikipedia "Earnshaw's Theorem" citation, 2011 http://en.wikipedia.org/wiki/Earnshaw%27s_theorem.
Supplementary European Search Report dated Apr. 17, 2014 for European Application No. 07736443 (parallel EP application to U.S. Appl. No. 13/343,737).

* cited by examiner

ELECTROMAGNETIC DEVICE FOR GENERATING ELECTRICAL CURRENT AND METHODS THEREOF

FIELD OF THE INVENTION

The present invention relates to an AC current generator device and method therefor, for generating an AC current by means of magnetic levitation.

BACKGROUND OF THE INVENTION

The following prior art is believed to be the current status of the art:

U.S. Pat. No. 6,351,049 describes a magnetic bearing for centering a first body relative to a second body. However, this prior art does not relate to generation of an electric current.

U.S. Pat. No. 3,512,852 describes a system for stabilizing a magnetic element levitated in a magnetic field. A movement of the magnetic element from a stability location is sensed and a response is forwarded to a control circuit for compensating the destabilization movement. This prior art describes magnetic levitation devices but does not relate to utilizing magnetic levitation for the generation of electricity.

U.S. Pat. No. 3,243,238 describes systems for suspending an object in a magnetic field. This prior art describes magnetic levitation devices but does not relate to utilizing magnetic levitation for the generation of electricity.

U.S. Pat. No. 4,585,282 describes a magnetic levitation apparatus using permanent magnets and electromagnets. Position and motion sensors provide signals for a compensation circuit for levitating an object. This prior art describes magnetic levitation devices but does not relate to utilizing magnetic levitation for the generation of electricity.

U.S. Pat. No. 7,394,183 describes an apparatus for generating an electric current by means of a mechanically supported lodestone core surrounded by concentric spheres. The inner sphere is constructed of magnetic material and the outer sphere of ferrogel/piezoelectric crystals for detecting movement of the inner sphere relative to the lodestone core. The piezoelectric relative movement thereof and generates electricity. This prior art does not utilize magnetic levitation for the generation of electricity.

U.S. Pat. No. 6,879,076 describes an electric current generator including a rotor coupled to a shaft for rotating within an external coil.

These prior art do not describe utilizing magnetic levitation for the generation of electricity. Magnetic levitation offers a relative cost-effective method for generating electricity. Magnetic levitation avoids, for example, using bearing and axles which generate heat and other mechanical losses due to, for example, friction.

Thus, there is an unmet need in the art for an electric current generator utilizing magnetic levitation for generating an electric current.

SUMMARY OF THE INVENTION

The present invention seeks to present to an AC current generator device and method therefor, for generating an AC current. The AC current generator includes, inter alia, a stator and a rotor. The stator includes, inter alia, an outer shell and the rotor includes, inter alia, an inner core. The stator encloses an evacuated chamber and the rotor is contained within the evacuated chamber.

A plurality of ferromagnets is attached to an inner surface of the stator and a plurality of diamagnets is attached to the outer surface of the rotor. The ferromagnets and the diamagnets have the same magnetic polarity. Thus, each member of the plurality of ferromagnets and each member of the plurality of diamagnets have a magnetic north polarity or each member of the plurality of ferromagnets and each member of the plurality of diamagnets members have a magnetic south polarity.

The rotor is suspended within the outer shell by magnetic levitation.

The physical properties of the rotor, including the weights of the inner core and the plurality of diamagnets are selected, such that the net repulsive magnetic force between the rotor and the stator balances gravitational effects. Typically, the rotor, including the inner core and the plurality of diamagnets, are located at rest at a stability location within the evacuated chamber of the stator. At least one magnetic flux detection unit is located within the magnetic field generated by at least one member of the plurality of ferromagnets. Disturbing the rotor from the stability location towards the magnetic field generates a change in the magnetic flux which is detected by magnetic flux detection units. An AC current is generated in the magnetic flux detection units by the change in the magnetic flux. Typically, an AC/DC rectifier is coupled, either wirelessly or wirely, to the magnetic flux detection unit and rectifies the AC current into a DC current.

In the present invention, the outer shell is typically of a geometrical shape which is selected from the group consisting of a sphere, a cylinder, a cube, a cone, a pyramid and a parallelepiped and the inner core is typically of a geometrical shape which is selected from the group consisting of a sphere, a cylinder, a cube, a cone, a pyramid and a parallelepiped.

In order to generate an electric current, the rotor is disturbed from the stability location, by applying an external force to the AC generator, such as a user agitating the generator. Alternatively, the generator is incorporated into a floating body, such as a ship, such that the wave motion of the sea disturbs the rotor from the stability location, resulting in the generator generating an AC current.

Preferably, the members of the plurality of ferromagnets and the members of the plurality of diamagnets are disc-shaped magnets. Additionally or alternatively, the inner surface of the outer shell and/or the outer surface of the inner core are at least partially covered, doped, immersed, impregnated, soaked, coated, painted with a magnetic powder in accordance with the AC current generation requirements and the requirement that the predetermined magnetic polarity of the inner surface of the outer shell and/or the outer surface of the inner core have the same magnetic polarity.

Additionally, typically, the inner core and the plurality of diamagnets have a uniform mass distribution. If the inner core and the plurality of diamagnets have a non-uniform mass distribution, the randomness of the motion of the rotor is increased. It is appreciated that the net magnetic field generated by the plurality of ferromagnets is appropriately selected in order to counterbalance the non-uniform mass distribution of the inner core and the mass of the plurality of diamagnets.

There is provided in accordance with a preferred embodiment of the present invention an AC current generator including a stator including an outer shell of non-magnetic material enclosing an evacuated chamber and having a distribution of a plurality of ferromagnets attached to an inner surface of the outer shell, a rotor including at least one inner core of non-magnetic material located at a stability location within the evacuated chamber and having a distribution of a plurality of diamagnets attached to an outer surface of the inner core, and at least one magnetic flux detection unit located within at least one magnetic field generated by at least one group of ferromagnets of the plurality of ferromagnets. Displacing the rotor from the stability location towards the at least one group of ferromagnets generates a change in magnetic flux in the magnetic field thereby generating an AC current in the at least one magnetic flux detection unit.

Further in accordance with a preferred embodiment of the present invention further including at least one rectifier unit electrically coupled to the at least one magnetic flux detection unit rectifying the AC current into a DC current the electrical coupling is selected from the group consisting of wireless coupling, wire coupling and any combination thereof.

Still further in accordance with a preferred embodiment of the present invention the outer shell is selected from the group consisting of a sphere, a cylinder, a cube, a cone, a pyramid and a parallelepiped.

Additionally in accordance with a preferred embodiment of the present invention a geometrical shape of the at least one inner core is selected from the group consisting of a sphere, a cylinder, a cube, a cone, a pyramid and a parallelepiped.

Moreover in accordance with a preferred embodiment of the present invention each member of the plurality of ferromagnets includes a disc-shaped ferromagnet.

Further in accordance with a preferred embodiment of the present invention each member of the plurality of diamagnets includes a disc-shaped diamagnet.

Typically, the outer shell of non-magnetic material is selected from the group consisting of aluminium, antimony, copper, gold, lead, magnesium, platinum, silver, tin, titanium, tungsten, vanadium and zinc and/or any combination thereof.

Typically, the at least one inner core of non-magnetic material is selected from the group consisting of aluminium, antimony, copper, gold, lead, magnesium, platinum, silver, tin, titanium, tungsten, vanadium and zinc and/or any combination thereof.

Further in accordance with a preferred embodiment of the present invention, each member of the plurality of ferromagnets includes a first predetermined magnetic polarity and each member of the plurality of diamagnets includes a second predetermined magnetic polarity.

The first predetermined magnetic polarity is a north magnetic polarity and the second predetermined magnetic polarity is a north magnetic polarity. Alternatively, the first predetermined magnetic polarity is a south magnetic polarity and the second predetermined magnetic polarity is a south magnetic polarity.

There is provided in accordance with a preferred embodiment of the present invention a method for generating an AC current including providing a stator including an outer shell of non-magnetic material enclosing an evacuated chamber and having a distribution of a plurality of ferromagnets attached to inner surface of the outer shell; providing a rotor including an at least one inner core of non-magnetic material located at a stability location within the evacuated chamber and having a distribution of a plurality of diamagnets attached to an outer surface of the at least one inner core, and providing at least one magnetic flux detection unit located within at least one magnetic field generated by at least one group of ferromagnets of the plurality of ferromagnets. Displacing the rotor from the stability location towards the at least one group of ferromagnets generates a change in magnetic flux in the magnetic field thereby generating an AC current in the at least one magnetic flux detection unit.

Further in accordance with a preferred embodiment of the present invention. further including rectifying the AC current into a DC current by at least one rectifier unit electrically coupled to the at least one magnetic flux detection unit.

Still further in accordance with a preferred embodiment of the present invention, each member of the plurality of ferromagnets includes a disc-shaped ferromagnet and each member of the plurality of diamagnets includes a disc-shaped diamagnet.

Additionally in accordance with a preferred embodiment of the present invention, each member one of the plurality of ferromagnets includes a first predetermined magnetic polarity and each member of the plurality of diamagnets includes a second predetermined magnetic polarity.

Further in accordance with a preferred embodiment of the present invention the first predetermined magnetic polarity is a north magnetic polarity and the second predetermined magnetic polarity is a north magnetic polarity. Alternatively, the first predetermined magnetic polarity is a south magnetic polarity and the second predetermined magnetic polarity is a south magnetic polarity.

Still further in accordance with a preferred embodiment of the present invention, the at least one magnetic flux detection unit includes a solenoid.

Additionally in accordance with a preferred embodiment of the present invention, further including generating a ferromagnetic surface on the outer shell by at least one of the following: covering the outer shell with a magnetic powder, doping the outer shell with a magnetic powder, immersing the outer shell with in a magnetic powder, impregnating the outer shell with a magnetic powder, soaking the outer shell with a magnetic material, coating the outer shell with a magnetic powder, painting the outer shell with a magnetic powder in accordance with the first predetermined magnetic polarity.

Moreover in accordance with a preferred embodiment of the present invention, further including generating a diamagnetic surface on the inner shell by at least one of the following: covering the inner shell with a magnetic powder, doping the inner shell with a magnetic powder, immersing the inner shell with in a magnetic powder, impregnating the inner shell with a magnetic powder, soaking the inner shell with a magnetic material, coating the inner shell with a magnetic powder, painting the inner shell with a magnetic powder in accordance with the second predetermined magnetic polarity.

Further in accordance with a preferred embodiment of the present invention, further including at least one superconducting element attached to the outer surface of the at least one inner core.

Still in accordance with a preferred embodiment of the present invention, the at least one magnetic flux detection unit includes a solenoid.

Additionally, in accordance with a preferred embodiment of the present invention, each member of the plurality of ferromagnets includes at least one of the following materials cobalt, ferrites, iron, magnetite, NdFeB, Barium Ferrite, Samarium Cobalt, AlNiCo magnets and lodestone.

Still further in accordance with a preferred embodiment of the present invention, each member of the plurality of ferromagnets is bonded to the inner surface of the outer shell and the diamagnets are bonded to the at least one inner core by at least one of the following bonding agents structural acrylic, cyanoacrylate, and epoxy adhesives and any combination thereof.

Further in accordance with a preferred embodiment of the present invention, each member of the plurality of diamagnets includes at least one of the following materials bismuth and superconducting material, the superconducting material is selected from the group consisting of Niobium-Titanium, bismuth strontium calcium copper oxide (BSCCO) and yttrium barium copper oxide (YBCO).

BRIEF DESCRIPTION OF THE DRAWINGS

A preferred embodiment of the current invention is described hereinbelow with reference to the following drawings.

DETAILED DESCRIPTION OF A PREFERRED EMBODIMENT OF THE PRESENT INVENTION

Figure 1A:
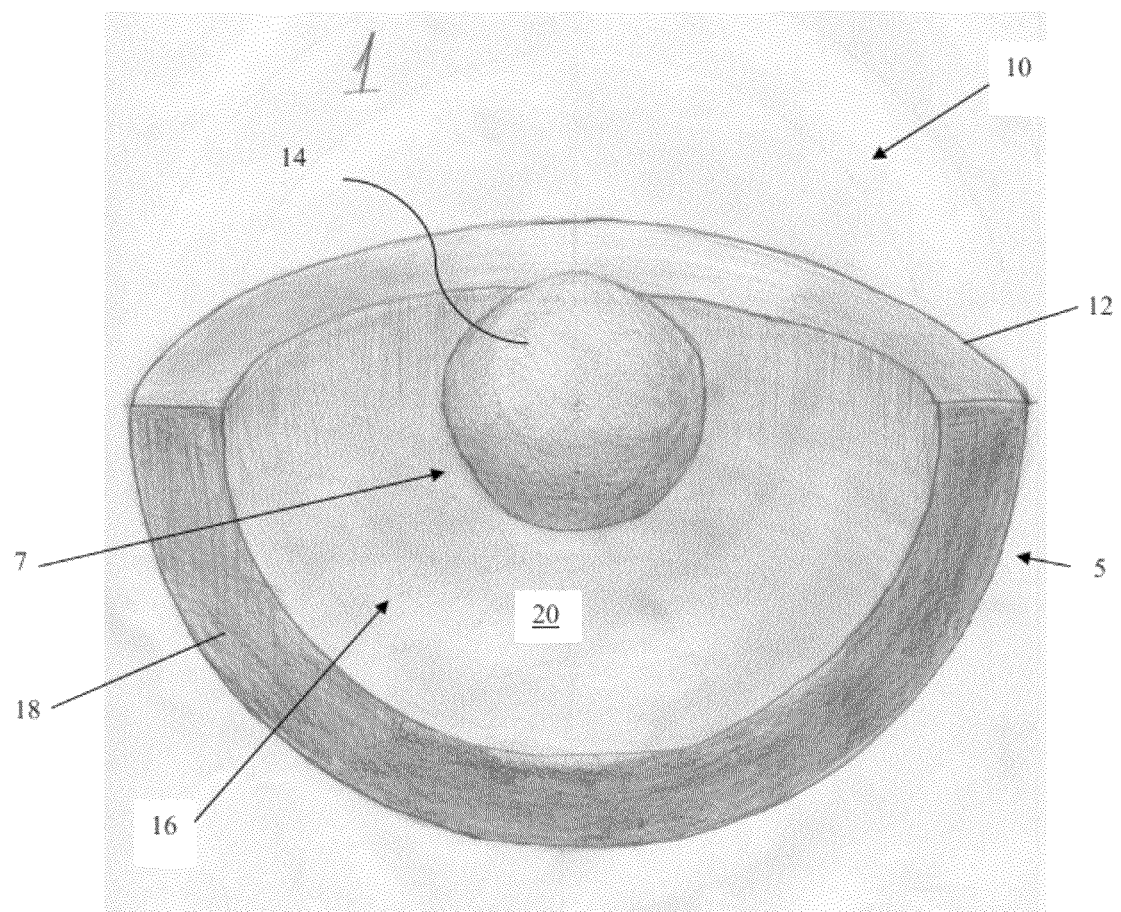
FIG. 1A shows a perspective view of a portion of the AC current generator, in accordance with a preferred embodiment of the present invention.

Reference is now made to FIG. 1A, which shows a perspective view of an AC current generator 10, in accordance with a preferred embodiment of the present invention. The AC current generator 10 includes, inter alia, a stator 5, which typically has a spherically-shaped outer shell 12 encompassing a rotor 7, which typically, has a spherically-shaped inner core 14. The stator 5 includes encloses an evacuated chamber 16, which is typically evacuated to an effective pressure, for example, a pressure of approximately 1 Pa.

Alternatively, the geometrical shape of the outer shell is selected from the group consisting of a cylinder, a cube, a cone, a pyramid and a parallelepiped. Additionally or alternatively, the geometrical shape of the inner core is selected from the group consisting of a cylinder, a cube, a cone, a pyramid and a parallelepiped.

Figure 1B:
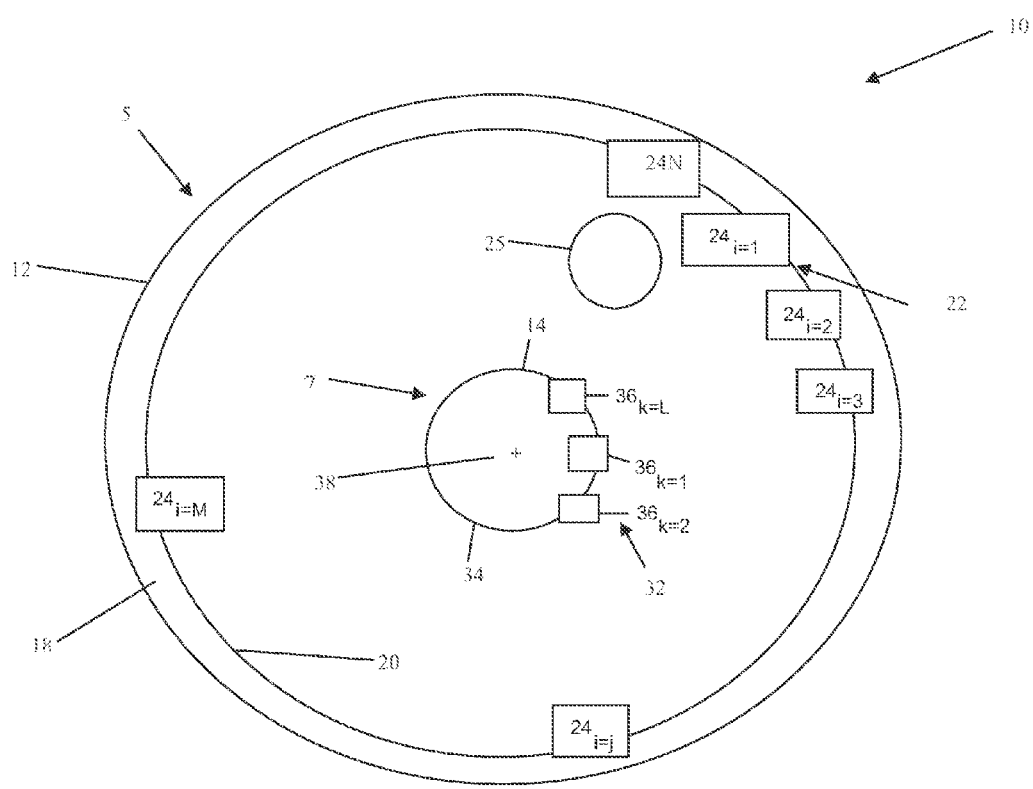
FIG. 1B shows a cross-sectional view of an AC current generator, in accordance with a preferred embodiment of the present invention.

Reference is now made to FIG. 1B, which shows a cross-sectional view of the AC current generator 10, in accordance with a preferred embodiment of the present invention. The outer shell 12 includes, inter alia, a substrate 18 and an inner surface 20. A plurality of ferromagnets 22 of a predetermined magnetic polarity, as described below, is attached to the inner surface 20 of the outer shell 12. The substrate 18 is typically constructed of a non-magnetic material, such as aluminium, antimony, copper, gold, lead, magnesium, platinum, silver, tin, titanium, tungsten, vanadium and zinc and any combination thereof. Preferably, each ferromagnet $24_{i=1 \ldots N}$ of the plurality of ferromagnets 22 is disc-shaped and includes a ferromagnetic material, such as cobalt, ferrites, iron, magnetite, NdFeB, Barium Ferrite, Samarium Cobalt, AlNiCo magnets and lodestone. Each ferromagnet $24_{i=1 \ldots N}$ is bonded to the inner surface 20 by a bonding agent, such as, structural acrylic, cyanoacrylate, and epoxy adhesives.

The inner core 14 includes, inter alia, a plurality of diamagnets 32 attached to an outer surface 34 of the inner core 14. The inner core 14 is also typically constructed of a non-magnetic material, such as aluminium, antimony, copper, gold, lead, magnesium, platinum, silver, tin, titanium, tungsten, vanadium and zinc and any combination thereof. Preferably, each diamagnet $36_{k=1 \ldots L}$ of the plurality of diamagnets 32 is disc-shaped and includes a diamagnetic material, such as bismuth or a superconducting material, such as Niobium-Titanium, bismuth strontium calcium copper oxide (BSCCO) and yttrium barium copper oxide (YBCO). Each diamagnet $36_{k=1 \ldots L}$ is typically bonded to the outer surface 34 of the inner core 14 by a bonding agent, such as, structural acrylic, cyanoacrylate, and epoxy adhesives.

It is appreciated that the total number of ferromagnets N does not necessarily the same as the total number of diamagnets L.

It is appreciated that selecting a superconductor magnet for attaching inner core 14, requires coupling the superconducting magnet to the requisite ancillary cooling equipment, as is known in the art.

Figure 1C:
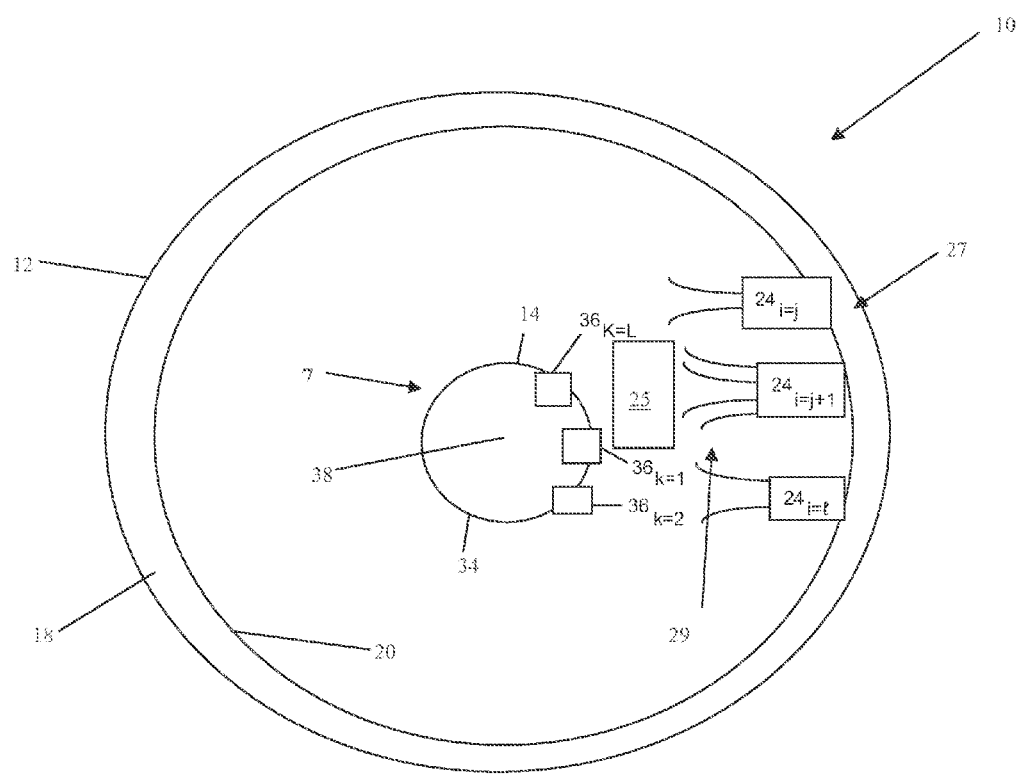
FIG. 1C shows the location of a magnetic flux detection unit of the AC current generator, in accordance with a preferred embodiment of the present invention.

Reference is now made to FIG. 1C, which presents a view of the outer shell 12 and the inner core 14 as well as the location of at least one magnetic flux detection unit 25, in accordance with a preferred embodiment of the present invention. The at least one magnetic flux detection unit 25, such as a solenoid, is located in proximity to at least one group 27 of the ferromagnets $24_{i=j \ldots l}$, such that the at least one magnetic flux detection unit 25 of the group 27, resides within a net magnetic field 29 generated by the group 27 of the ferromagnets $24_{i=j \ldots l}$. It is appreciated that the net magnetic field 29 is the resultant magnetic field generated by the ferromagnets $24_{i=j \ldots l}$. A displacement of the inner core 14 and the diamagnets $36_{k=1 \ldots L}$ from a stability location 38 (FIG. 1B), as described below, results in a change in the magnetic field flux within the unit 25. The unit 25 detects the change in the magnetic field flux and an AC current is generated within the unit 25, as described below.

Figure 2:
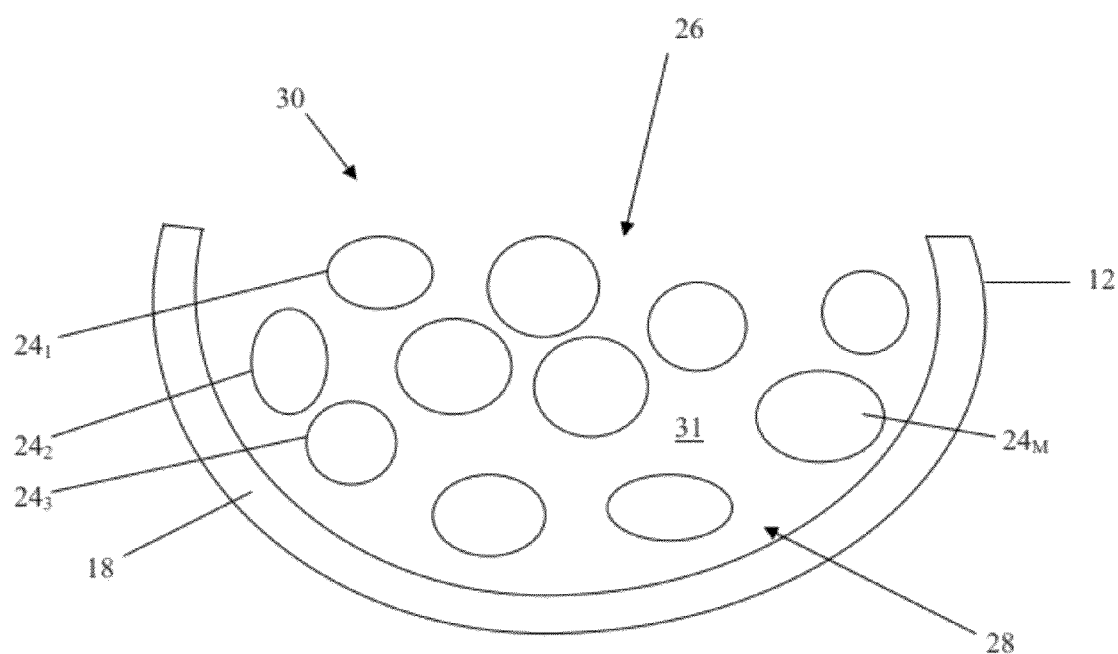
FIG. 2 shows a distribution of a group of disc-shaped ferromagnets attached to a portion of the inner surface of the outer shell of the AC current generator, in accordance with a preferred embodiment of the present invention.

Reference is now made to FIG. 2, which shows a portion 28 of a distribution 30 of the disc-shaped ferromagnets $24_{j=1 \ldots M}$, (M<N), which are located on a portion 31 of the outer shell 12, in accordance with a preferred embodiment of the present invention. It is appreciated that the total number of disc-shaped ferromagnets N and the distribution 30 of the disc-shaped ferromagnets $24_{i=1 \ldots N}$ are selected so that the net magnetic field generated therefrom supports the rotor 7, including the inner core 14 and the plurality of disc-shaped diamagnets $36_{k=1 \ldots L}$, at the stability location 38 (FIG. 1B), thereby overcoming gravitational effects, as is known in the art. Typically, for the spherically-shaped outer shell 12 and the spherically-shaped inner core 14, the stability location 38 is located at the center of the outer shell 12.

Figure 3:
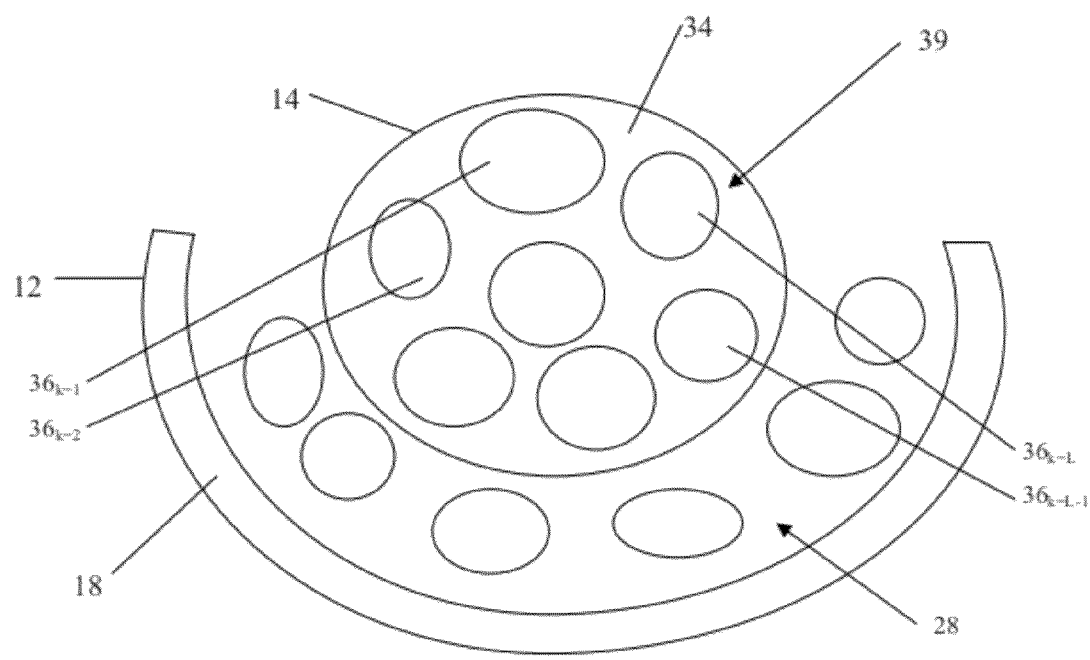
FIG. 3 shows a distribution of a group of disc-shaped diamagnets attached to the outer surface of the inner core of the AC current generator, in accordance with a preferred embodiment of the present invention.

Reference is now made to FIG. 3, which shows a distribution 39 of the disc-shaped diamagnets $36_{k=1 \ldots L}$ attached to the outer surface 34 of the inner core 14, in accordance with a preferred embodiment of the present invention. It is appreciated that the distribution of diamagnets $36_{k=1 \ldots L}$ is selected so that the rotor 7, including the inner core 14 and the plurality of diamagnets $36_{k=1\ldots L}$, are supported at the stability location 38 (FIG. 1B) in order to overcome gravitational effects, as is known in the art.

Figure 4:
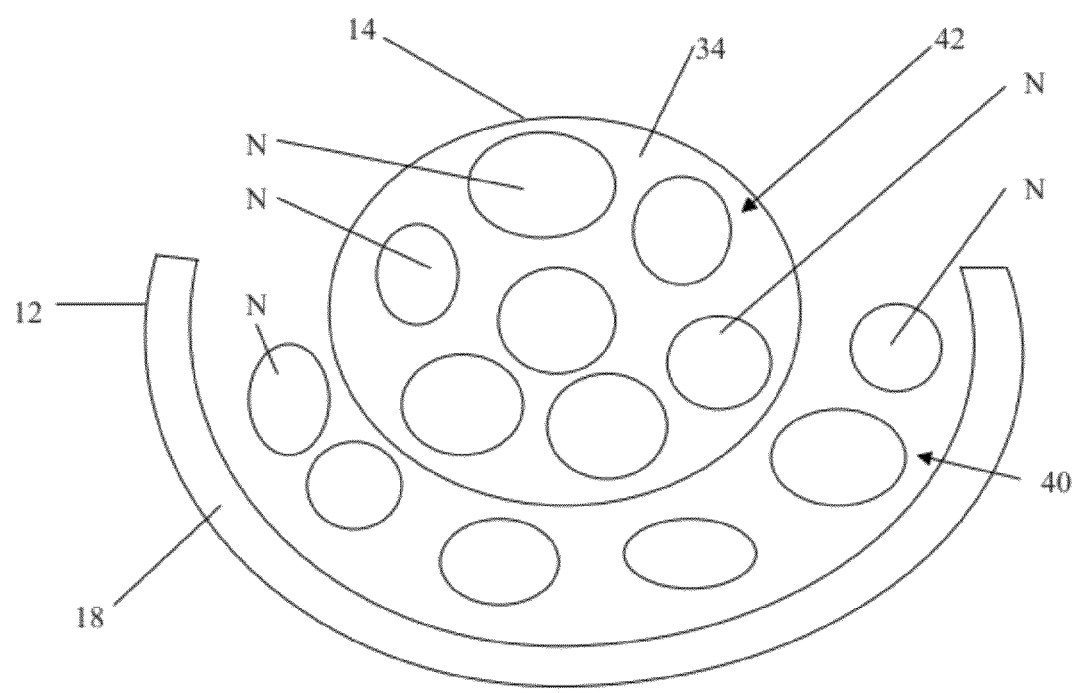
FIG. 4 shows a distribution of magnetic north-polarity ferromagents located on the inner surface of the outer shell and a distribution of magnetic north-polarity diamagnets located on the outer surface of the inner core, in accordance with a preferred embodiment of the present invention.

Reference is now made to FIG. 4, which shows a magnetic polarity distribution 40 of a portion of the ferromagents $24_{j=1\ldots M}$ and a magnetic polarity distribution 42 of a portion of the diamagnets $36_{k=1\ldots L}$, in accordance with a preferred embodiment of the present invention. In FIG. 4, the ferromagents $24_{j=1\ldots M}$ and the diamagnets $36_{k=1\ldots L}$ have the same magnetic polarity and a net repulsive force is generated between the ferromagnets $24_{j=1\ldots M}$ and the diamagnets $36_{k=1\ldots L}$. In the current embodiment, the ferromagnets $24_{i=1\ldots N}$ and the diamagnets $36_{k=1\ldots L}$ have a north magnetic polarity.

Figure 5:
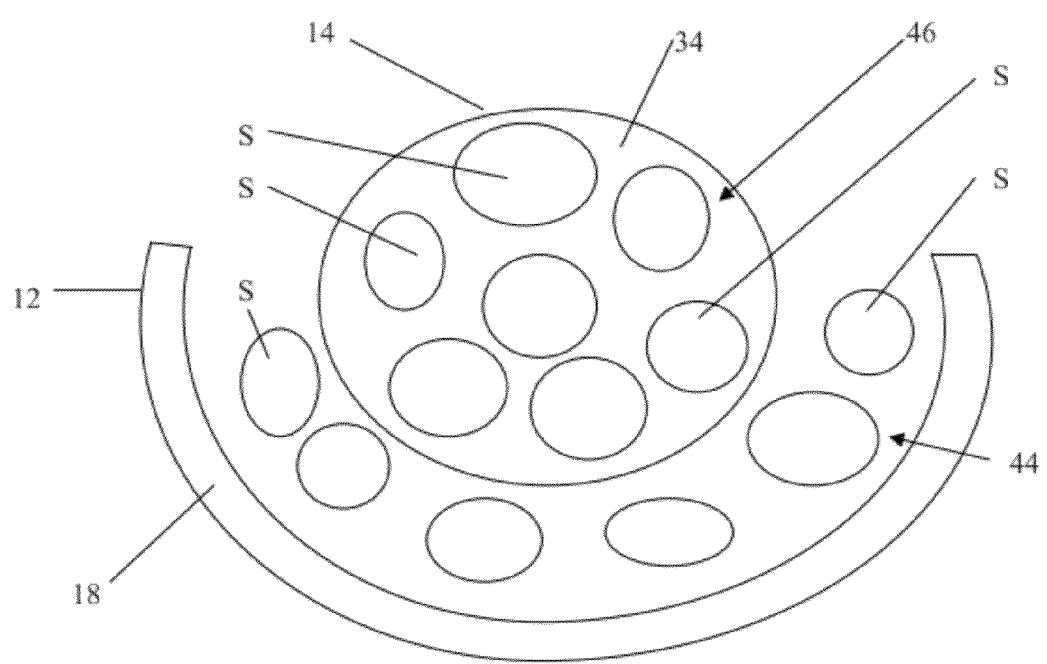
FIG. 5 shows a distribution of magnetic south-polarity ferromagents located on the inner surface of the outer shell and a distribution of magnetic south-polarity diamagnets located on the outer surface of the inner core, in accordance with a preferred embodiment of the present invention.

Reference is now made to FIG. 5, which shows a magnetic polarity distribution polarity 44 of the ferromagents $24_{j=1\ldots M}$ and a magnetic polarity distribution 46 of the diamagnets $36_{k=1\ldots L}$. In FIG. 5, the ferromagnets $24_{j=1\ldots M}$ and the diamagnets $36_{k=1\ldots L}$ have the same magnetic polarity and a net repulsive force is generated between the ferromagnets $24_{j=1\ldots M}$ and the diamagnets $36_{k=1\ldots L}$. In the current embodiment, the ferromagnets $24_{j=1\ldots N}$ and the diamagnets $36_{k=1\ldots L}$ have a south magnetic polarity.

It is appreciated that the weight of the rotor 7, including the weights of the inner core 14 and the plurality of diamagnets $36_{k=1\ldots L}$, is selected such that the net magnetic repulsive force generated between that the plurality of ferromagnets 22 and the plurality of diamagnets 34 overcomes gravitational effects, as is known in the art. In a situation, in which the net magnetic repulsive force between that the plurality of ferromagnets 22 and the plurality of diamagnets 34 overcomes the gravitational effects, the rotor 7, including the inner core 14 and the plurality of diamagnets $36k=1\ldots L$, is at rest and the rotor 7 is located at the stability location 38 (FIG. 1B).

At the stability location 38, in which the rotor 7, including, inter alia, the inner core 14 and the plurality of diamagnets $36_{k=1\ldots L}$, is at rest, the net dipole moments of the ferromagnets $24_{i=1\ldots N}$ is at least equal to the net dipole moments of the diamagnets $36_{k=1\ldots L}$, such that the effects of the gravitational field are counterbalanced.

Figure 6:
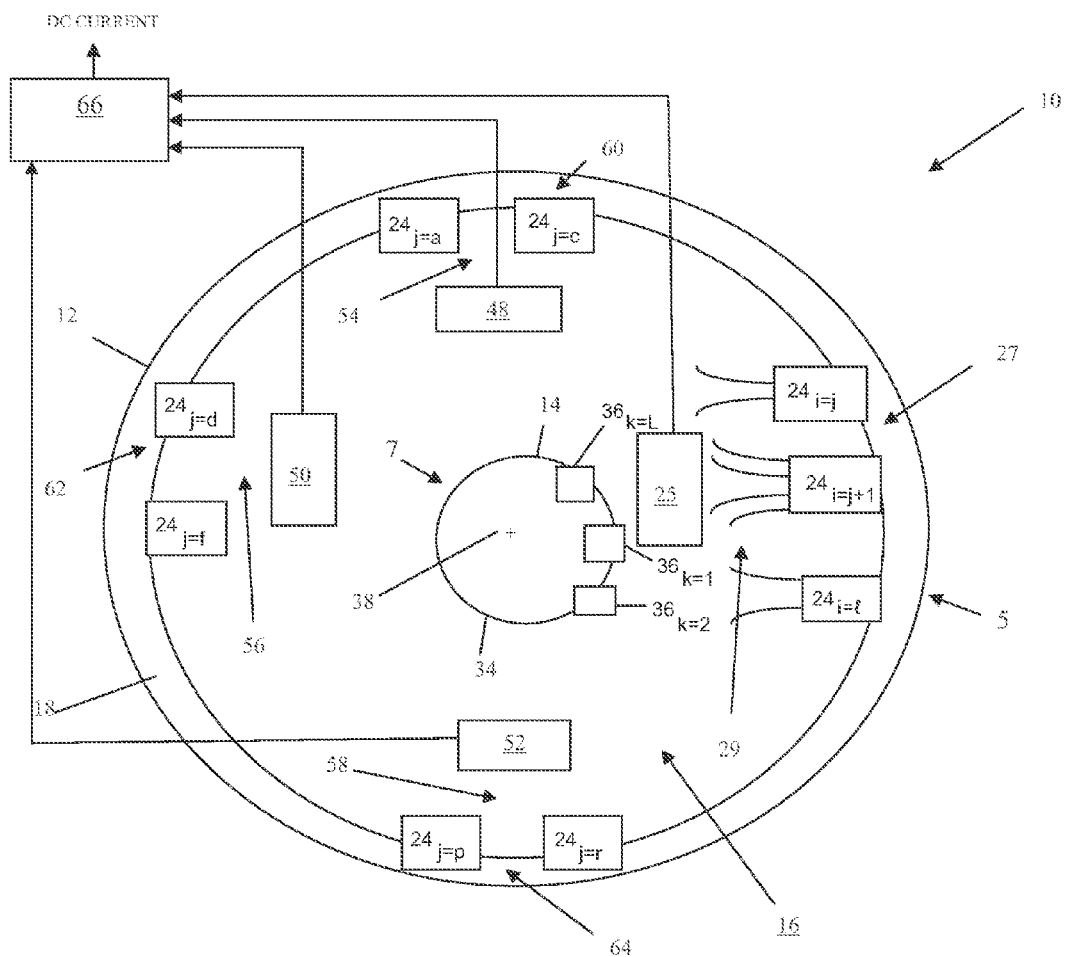
FIG. 6 shows a typical distribution of the various elements of the AC current generator, including the location of the magnetic flux detection units within the AC current generator, in accordance with a preferred embodiment of the present invention.

Reference is now made to FIG. 6, which shows typical magnetic flux detection units 25, 48, 50 and 52 located within the AC current generator 10, in accordance with a preferred embodiment of the present invention. The units 25, 48, 50 and 52, which are typically solenoid devices, are located within the evacuated chamber 16 and within net magnetic fields 29, 54, 56 and 58. The net magnetic fields 29, 54, 56 and 58 are generated by the magnetic groups 27, 60, 62 and 64, respectively. The magnetic groups 27, 60, 62 and 64 typically include ferromagnets $24_{i=j\ldots b}$, $24_{j=a\ldots c}$, $24_{i=d\ldots f}$ and $24_{i=p\ldots r}$, respectively.

The units 25, 48, 50 and 52 are electrically coupled, wirelessly and/or wirely, to an AC/DC rectifier 66.

On applying a perturbation to the AC current generator 10, such as applying an external force to the generator 10, the rotor 7, including inner core 14 and the plurality of diamagnets $36_{k=1\ldots L}$, deviates from the stability location 38 and the rotor 7 follows the force gradient in the direction of the applied external force. The inner core 14 and the plurality of diamagnets $36_{k=1\ldots L}$ are displaced, for example, towards the at least one magnetic flux detection unit 25.

The displacement of the rotor 7 from the stability location 38 towards the group of ferromagnets 27 generates a change in magnetic flux in the magnetic field 29 thereby generating an AC current in the at least one magnetic flux detection unit 25. The AC current is applied to the rectifier 66.

Due to the magnetic repulsion forces between the portion 27 of the ferromagnets and the diagments $36_{k=1\ldots L}$, the rotor 7 is repulsed and the inner core 14 and the plurality of diamagnets $36_{k=1\ldots L}$ move back towards the stability location 38.

Typically, the rotor 7 overshoots the stability location 38 and moves towards a second group of magnetic fields, for example, the magnetic field 56 and due to the change in flux in the unit 50, an AC current is generated in the magnetic flux detection unit 50. The rotor 7 is repulsed by the magnetic field 56 in a direction towards the stability location 38.

The rotor 7 again, typically, overshoots the stability location 38 and the process of repulsion by the magnetic field group is repeated. The change in the magnetic flux generates an AC current. It is appreciated that the motion of the rotor 7 is random and variable and depends on the direction of the applied force gradient.

Due the net magnetic repulsion forces between the rotor 7 and the magnetic field groups 29, 54, 56 and 58 and the overshooting of the stability location 38, a process of repulsion and overshooting is produced and an AC current is generated in the magnetic flux detection units 25, 48, 50 and 52. The frequency of the AC current depends on the number of times the rotor 7 is repulsed by the relevant magnetic field group per second.

It is appreciated that in the evacuated chamber 16, the air resistance to the displacement of the rotor 7 is reduced. However, due to the generation of eddy currents in the diamagnets $36_{k=1\ldots L}$, frictional drag effects and induction heating are generated within the diamagnets $36_{k=1\ldots L}$ and repulsive forces to the movement of the rotor 7 are generated. The frictional drag and heating effects limit and restrain the motion of the rotor 7 until the rotor 7 comes to a rest, typically, at the stability location 38.

It is appreciated that the external force applied to the generator 10 must be of sufficient strength so as to overcome the magnetic repulsion force between the ferromagnets $24_{i=1\ldots N}$ and the diamagnets $36_{k=1\ldots L}$ and to deviate the rotor 7 from the stability location 38 towards the outer shell 12.

A typical external force is generated by a user of the AC current generator 10, agitating the generator 10 and disturbing the inner core 14 and the plurality of diamagnets $36_{k=1\ldots L}$ from the stability location 38.

Additionally or alternatively, the generator 10 is incorporated into a floating body, such as a ship or a electrical wave generator, such that the wave motion of the sea deviates the inner core 14 and the diamagnets $36_{k=1\ldots L}$ from the stable location 38 and an AC current is generated in the unit 25.

It is appreciated that the rotor 7 may be initially displaced towards any member of the group of ferromagnets 27, 60, 62 and 64.

The displacement of the inner core 14 and the diamagnets $36_{k=1\ldots L}$ within the magnetic field groups 27, 60, 62 and 64 results in a change in the magnetic flux in the units 25, 48, 50 and 52, an AC current, such as a half sinewave AC current, is generated. The AC current is applied to the rectifier 66 which rectifies the AC current to a DC current, as is known in the art.

It is appreciated that if an AC current is required, the generated AC current bypasses the rectifier 66 and is applied to an AC smoothing circuit, as is known in the art.

Additionally or alternatively, the diamagnets $24_{i=1\ldots L}$ includes at least one superconducting element, as constructed from such as Niobium-Titanium. It is appreciated that the at least one superconducting element is coupled to the required cooling apparatus, as in known in the art.

In the foregoing description, embodiments of the invention, including preferred embodiments, have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

The invention claimed is:

1. An AC current generator comprising:
   a stator comprising an outer shell of non-magnetic material enclosing an evacuated chamber and having a distribution of a plurality of ferromagnets attached to an inner surface of said outer shell;
   a rotor comprising at least one inner core of non-magnetic material located at a stability location within said evacuated chamber and having a distribution of a plurality of diamagnets attached to an outer surface of said inner core, and
   at least one magnetic flux detection unit located within at least one magnetic field generated by at least one group of ferromagnets of said plurality of ferromagnets,
   wherein displacing said rotor from said stability location towards said at least one group of ferromagnets generates a change in magnetic flux in said magnetic field thereby generating an AC current in said at least one magnetic flux detection unit;
   wherein each member of said plurality of ferromagnets comprises a disc-shaped ferromagnet;
   wherein said outer shell of non-magnetic material is selected from the group consisting of aluminium, antimony, copper, gold, lead, magnesium, platinum, silver, tin, titanium, tungsten, vanadium and zinc and/or any combination thereof.

2. The AC current generator according to claim 1, further comprising at least one rectifier unit electrically coupled to said at least one magnetic flux detection unit rectifying said AC current into a DC current said electrical coupling is selected from the group consisting of wireless coupling, wire coupling and any combination thereof.

3. The AC current generator according to claim 1, wherein a geometrical shape of said outer shell is selected from the group consisting of a sphere, a cylinder, a cube, a cone, a pyramid and a parallelepiped.

4. The electromagnetic electrical current generator according to claim 1, wherein a geometrical shape of said at least one inner core is selected from the group consisting of a sphere, a cylinder, a cube, a cone, a pyramid and a parallelepiped.

5. The AC current generator according to claim 1, wherein each member of said plurality of ferromagnets comprises a first predetermined magnetic polarity.

6. The AC current generator according to claim 1, wherein said each member of said plurality of diamagnets comprises a second predetermined magnetic polarity.

7. The AC current generator according to claims 5 or 6, wherein said first predetermined magnetic polarity is a north magnetic polarity and said second predetermined magnetic polarity is a north magnetic polarity.

8. The AC current generator according to claims 5 or 6, wherein said first predetermined magnetic polarity is a south magnetic polarity and said second predetermined magnetic polarity is a south magnetic polarity.

9. The AC current generator according to claims 5 or 6, further comprising generating a ferromagnetic surface on said outer shell by at least one of the following: covering said outer shell with a magnetic powder, doping said outer shell with a magnetic powder, immersing said outer shell with in a magnetic powder, impregnating said outer shell with a magnetic powder, soaking said outer shell with a magnetic material, coating said outer shell with a magnetic powder, painting said outer shell with a magnetic powder in accordance with said first predetermined magnetic polarity.

10. The AC current generator according to claims 5 or 6, further comprising generating a diagmagnetic surface on said inner shell by at least one of the following: covering said inner shell with a magnetic powder, doping said inner shell with a magnetic powder, immersing said inner shell with in a magnetic powder, impregnating said inner shell with a magnetic powder, soaking said inner shell with a magnetic material, coating said inner shell with a magnetic powder, painting said inner shell with a magnetic powder in accordance with said second predetermined magnetic polarity.

11. The AC current generator according to claim 1, wherein said at least one magnetic flux detection unit comprises a solenoid.

12. The AC current generator according to claim 1, wherein each member of said plurality of diagmagnets further comprising at least one superconducting element attached to said outer surface of said at least one inner core; further wherein said AC current generator comprising at least one cooling means in communication with id at least one inner core.

13. The AC current generator according to claim 1, wherein each member of said plurality of ferromagnets comprises at least one of the following materials cobalt, ferrites, iron, magnetite, NdFeB, Barium Ferrite, Samarium Cobalt, AlNiCo magnets and lodestone.

14. The AC current generator according to claim 1, wherein each member of said plurality of ferromagnets is bonded to said inner surface of said outer shell by at least one of the following bonding agents structural acrylic, cyanoacrylate, and epoxy adhesives.

15. The AC current generator according to claim 1, wherein each member of said plurality of diagmagnets comprises at least one bismuth material.

16. The AC current generator according to claim 1, wherein each member of said plurality of diamagnets is bonded to said outer surface of said inner shell by at least one of the following bonding agents structural acrylic, cyanoacrylate, and epoxy adhesives.

17. The AC current generator according to claim 1, wherein each member of said plurality of diagmagnets comprises at least one superconducting material, said superconducting material is selected from the group consisting of Niobium-Titanium, bismuth strontium calcium copper oxide (BSCCO) and yttrium barium copper oxide (YBCO); further wherein said AC current generator further comprises at least one cooling means in communication with id at least one inner core.

18. An AC current generator comprising:
   a stator comprising an outer shell of non-magnetic material enclosing an evacuated chamber and having a distribution of a plurality of ferromagnets attached to an inner surface of said outer shell;
   a rotor comprising at least one inner core of non-magnetic material located at a stability location within said evacuated chamber and having a distribution of a plurality of diamagnets attached to an outer surface of said inner core, and
   at least one magnetic flux detection unit located within at least one magnetic field generated by at least one group of ferromagnets of said plurality of ferromagnets, wherein displacing said rotor from said stability location towards said at least one group of ferromagnets generates a change in magnetic flux in said magnetic field thereby generating an AC current in said at least one magnetic flux detection unit;

wherein each member of said plurality of diamagnets comprises a disc-shaped diamagnet;

wherein said at least one inner core of non-magnetic material is selected from the group consisting of aluminium, antimony, copper, gold, lead, magnesium, platinum, silver, tin, titanium, tungsten, vanadium and zinc and/or any combination thereof.

19. A method for generating an AC current comprising:
providing a stator comprising an outer shell of non-magnetic material enclosing an evacuated chamber and having a distribution of a plurality of ferromagnets attached to inner surface of said outer shell;
providing a rotor comprising an at least one inner core of non-magnetic material located at a stability location within said evacuated chamber and having a distribution of a plurality of diamagnets attached to an outer surface of said at least one inner core, and
providing at least one magnetic flux detection unit located within at least one magnetic field generated by at least one group of ferromagnets of said plurality of ferromagnets,
displacing said rotor from said stability location towards said at least one group of ferromagnets generates a change in magnetic flux in said magnetic field thereby generating an AC current in said at least one magnetic flux detection unit;
wherein each member of said plurality of ferromagnets comprises a disc-shaped ferromagnet;

wherein said outer shell of non-magnetic material is selected from the group consisting of aluminium, antimony, copper, gold, lead, magnesium, platinum, silver, tin, titanium, tungsten, vanadium and zinc and/or any combination thereof.

20. The method according to claim 19, further comprising rectifying said AC current into a DC current by at least one rectifier unit electrically coupled to said at least one magnetic flux detection unit.

21. The method according to claim 19, wherein member one of said plurality of ferromagnets comprises a first predetermined magnetic polarity.

22. The method according to claim 19, wherein said each member of said plurality of diamagnets comprises a second predetermined magnetic polarity.

23. The method according to claims 21 or 22, wherein said first predetermined magnetic polarity is a north magnetic polarity and said second predetermined magnetic polarity is a north magnetic polarity.

24. The method according to claims 21 or 22, wherein said first predetermined magnetic polarity is a south magnetic polarity and said second predetermined magnetic polarity is a south magnetic polarity.

25. The method according to claim 19, wherein said at least one magnetic flux detection unit comprises a solenoid.

26. A method for generating an AC current comprising:
providing a stator comprising an outer shell of non-magnetic material enclosing an evacuated chamber and having a distribution of a plurality of ferromagnets attached to inner surface of said outer shell;
providing a rotor comprising an at least one inner core of non-magnetic material located at a stability location within said evacuated chamber and having a distribution of a plurality of diamagnets attached to an outer surface of said at least one inner core, and
providing at least one magnetic flux detection unit located within at least one magnetic field generated by at least one group of ferromagnets of said plurality of ferromagnets,
displacing said rotor from said stability location towards said at least one group of ferromagnets generates a change in magnetic flux in said magnetic field thereby generating an AC current in said at least one magnetic flux detection unit;
wherein each member of said plurality of diamagnets comprises a disc-shaped diamagnet; wherein said at least one inner core of non-magnetic material is selected from the group consisting of aluminium, antimony, copper, gold, lead, magnesium, platinum, silver, tin, titanium, tungsten, vanadium and zinc and/or any combination thereof.

27. An AC current generator comprising:
a stator comprising an outer shell of non-magnetic material enclosing an evacuated chamber and having a distribution of a plurality of ferromagnets attached to an inner surface of said outer shell;
a rotor comprising at least one inner core of non-magnetic material located at a stability location within said evacuated chamber and having a distribution of a plurality of diamagnets attached to an outer surface of said inner core, and
at least one magnetic flux detection unit located within at least one magnetic field generated by at least one group of ferromagnets of said plurality of ferromagnets,
wherein displacing said rotor from said stability location towards said at least one group of ferromagnets generates a change in magnetic flux in said magnetic field thereby generating an AC current in said at least one magnetic flux detection unit;
further comprising generating a ferromagnetic surface on said outer shell by at least one of the following: covering said outer shell with a magnetic powder, doping said outer shell with a magnetic powder, immersing said outer shell with in a magnetic powder, impregnating said outer shell with a magnetic powder, soaking said outer shell with a magnetic material, coating said outer shell with a magnetic powder, painting said outer shell with a magnetic powder in accordance with said first predetermined magnetic polarity.

\* \* \* \* \*